(12) United States Patent
Ikeda et al.

(10) Patent No.: US 12,198,672 B2
(45) Date of Patent: Jan. 14, 2025

(54) VOICE SPEECH DEVICE, VOICE SPEECH SYSTEM, AND VOICE SPEECH METHOD TO CREATE NAME OF A TARGET APPLIANCE BASED ON ITS OPERATION HISTORY

(71) Applicant: Panasonic Intellectual Property Management Co., Ltd., Osaka (JP)

(72) Inventors: Yoichi Ikeda, Hyogo (JP); Kazuhiro Kuroyama, Osaka (JP); Satoru Matsunaga, Osaka (JP); Yoshiki Ohashi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 334 days.

(21) Appl. No.: 17/773,798

(22) PCT Filed: Jul. 8, 2021

(86) PCT No.: PCT/JP2021/025763
§ 371 (c)(1),
(2) Date: May 2, 2022

(87) PCT Pub. No.: WO2022/176226
PCT Pub. Date: Aug. 25, 2022

(65) Prior Publication Data
US 2023/0123290 A1  Apr. 20, 2023

(30) Foreign Application Priority Data
Feb. 22, 2021  (JP) .................................. 2021-026023

(51) Int. Cl.
*G10L 13/027* (2013.01)
*A47L 9/28* (2006.01)
(Continued)

(52) U.S. Cl.
CPC .......... *G10L 13/027* (2013.01); *G05D 1/0274* (2013.01); *A47L 9/2826* (2013.01);
(Continued)

(58) Field of Classification Search
CPC ... H04N 21/41265; G06F 3/167; D06F 34/30; A47L 9/2826
(Continued)

(56) References Cited

U.S. PATENT DOCUMENTS

| | | | |
|---|---|---|---|
| 2005/0166354 A1* | 8/2005 | Uehigashi | ............. A47L 9/2826 15/319 |
| 2008/0059178 A1* | 3/2008 | Yamamoto | ....... H04N 21/41265 704/E15.005 |

(Continued)

FOREIGN PATENT DOCUMENTS

| | | | | |
|---|---|---|---|---|
| CN | 204662086 U | * | 9/2015 | ............. D06F 39/00 |
| CN | 105212547 A | * | 1/2016 | ............. D06F 29/00 |

(Continued)

OTHER PUBLICATIONS

International Search Report dated Oct. 5, 2021 issued in International Patent Application No. PCT/JP2021/025763.

*Primary Examiner* — Farzad Kazeminezhad
(74) *Attorney, Agent, or Firm* — Rimon P.C.

(57) ABSTRACT

A voice speech device includes: a display; a selector that causes the display to display one or more candidates for a name to be provided to a target appliance (appliance), and accepts selection of one name among the one or more candidates; a receiver for receiving first state information that is sent from the target appliance and indicates a state of the target appliance; a speech sentence creator that creates a speech sentence for notifying the state of the target appliance, based on the first state information received by the receiver, the speech sentence containing the one name (Continued)

accepted by the selector; and a voice outputter that outputs the speech sentence by voice.

6 Claims, 10 Drawing Sheets

(51) Int. Cl.
*G05D 1/00* (2006.01)
*G06F 3/16* (2006.01)
*G10L 15/30* (2013.01)
*H04N 21/41* (2011.01)

(52) U.S. Cl.
CPC .............. *G06F 3/167* (2013.01); *G10L 15/30* (2013.01); *H04N 21/41265* (2020.08)

(58) Field of Classification Search
USPC ........................................ 704/15.005; 15/319
See application file for complete search history.

(56) References Cited

U.S. PATENT DOCUMENTS

| | | | | |
|---|---|---|---|---|
| 2020/0236176 A1* | 7/2020 | Park | ........................ | G06F 3/167 |
| 2022/0254345 A1* | 8/2022 | Lee | ........................ | G10L 15/30 |

FOREIGN PATENT DOCUMENTS

| | | |
|---|---|---|
| JP | 2012-133764 A | 7/2012 |
| JP | 2013-074511 A | 4/2013 |
| JP | 2015-164251 A | 2/2014 |
| JP | 2016-151838 A | 8/2016 |

* cited by examiner

VOICE SPEECH DEVICE, VOICE SPEECH SYSTEM, AND VOICE SPEECH METHOD TO CREATE NAME OF A TARGET APPLIANCE BASED ON ITS OPERATION HISTORY

CROSS-REFERENCE OF RELATED APPLICATIONS

This application is the U.S. National Phase under 35 U.S.C. § 371 of International Patent Application No. PCT/JP2021/025763, filed on Jul. 8, 2021, which in turn claims the benefit of Japanese Patent Application No. 2021-026023, filed on Feb. 22, 2021, the entire disclosures of which Applications are incorporated by reference herein.

TECHNICAL FIELD

The present disclosure relates to a voice speech device, a voice speech system, and a voice speech method.

BACKGROUND ART

There have conventionally been devices that output (speech) voice in electronic appliances, such as household electric appliances (see Patent Literature (PTL) 1, for example).

PTL 1 discloses a server device that creates voice data for allowing an electronic appliance to speech voice based on characteristic information set according to at least one of attribute information of a user who uses the electronic appliance and attribute information of the electronic appliance.

CITATION LIST

Patent Literature

PTL 1: Japanese Unexamined Patent Application Publication No. 2015-164251

SUMMARY OF INVENTION

Technical Problem

An appliance that outputs voice may output voice for notifying a user of information relating to another appliance in addition to information relating to the appliance itself. In this case, it is necessary to appropriately notify a user of which appliance the information relates to.

Accordingly, a name (appliance name) of the appliance concerned may be included in a speech sentence that is to be notified to a user, for example. In view of the above, it is desired that an appropriate appliance name can be easily set.

The present disclosure provides a voice speech device and so on, in which an appropriate appliance name can be easily set.

Solution to Problem

A voice speech device according to an aspect of the present disclosure includes: a display; a selector that causes the display to display one or more candidates for a name to be provided to a target appliance, and accepts selection of one name among the one or more candidates; a receiver for receiving first state information that is sent from the target appliance and indicates a state of the target appliance; a speech sentence creator that creates a speech sentence for notifying the state of the target appliance based on the first state information received by the receiver, the speech sentence containing the one name accepted by the selector; and a voice outputter that outputs the speech sentence by voice.

A voice speech system according to another aspect of the present disclosure includes: a display device; a reception device that accepts selection from a user; a server device including: a selector that causes the display device to display one or more candidates for a name to be provided to a target appliance and accepts the selection for one name among the one or more candidates via the reception device; a receiver for receiving first state information that is sent from the target appliance and indicates a state of the target appliance; and a speech sentence creator that creates a speech sentence for notifying the state of the target appliance based on the first state information received by the receiver, the speech sentence containing the one name accepted by the reception device, and a voice outputting device that outputs the speech sentence by voice.

A voice speech method according to still another aspect of the present disclosure includes: causing a display to display one or more candidates for a name to be provided to a target appliance, and accepting selection of one name among the one or more candidates; creating a speech sentence for notifying a state of the target appliance, based on first state information, when a receiver receives the first state information that is sent from the target appliance and indicates the state of the target appliance, the speech sentence containing the one name accepted in the accepting; and outputting the speech sentence by voice.

It should be noted that these comprehensive or specific aspects may be embodied by a system, a method, an integrated circuit, a computer program, a computer-readable recording medium such as a CD-ROM, or any combination of the system, the method, the integrated circuit, the computer program, and the recording medium.

Advantageous Effects of Invention

According to the present disclosure, a voice speech device and so on, which can easily set an appropriate appliance name, can be provided.

DESCRIPTION OF EMBODIMENTS

Embodiments of the present disclosure are described hereinafter, with reference to the drawings. It should be noted that every embodiment described below shows a specific example of the present disclosure. Accordingly, numerical values, shapes, materials, structural components, arrangement positions and connection forms of the structural components, steps, an order of the steps, and so on described in the following embodiments are examples, and are not intended to limit the present disclosure. Thus, structural components that are not described in independent claims reciting the most significant concepts of the present disclosure will be described as optional structural components, among structural components in the following embodiments.

Each drawing is a schematic diagram and is not necessarily illustrated in a precise manner. In addition, the same reference signs are allocated to structural members having the same configuration.

EMBODIMENTS

Configuration

Figure 1:
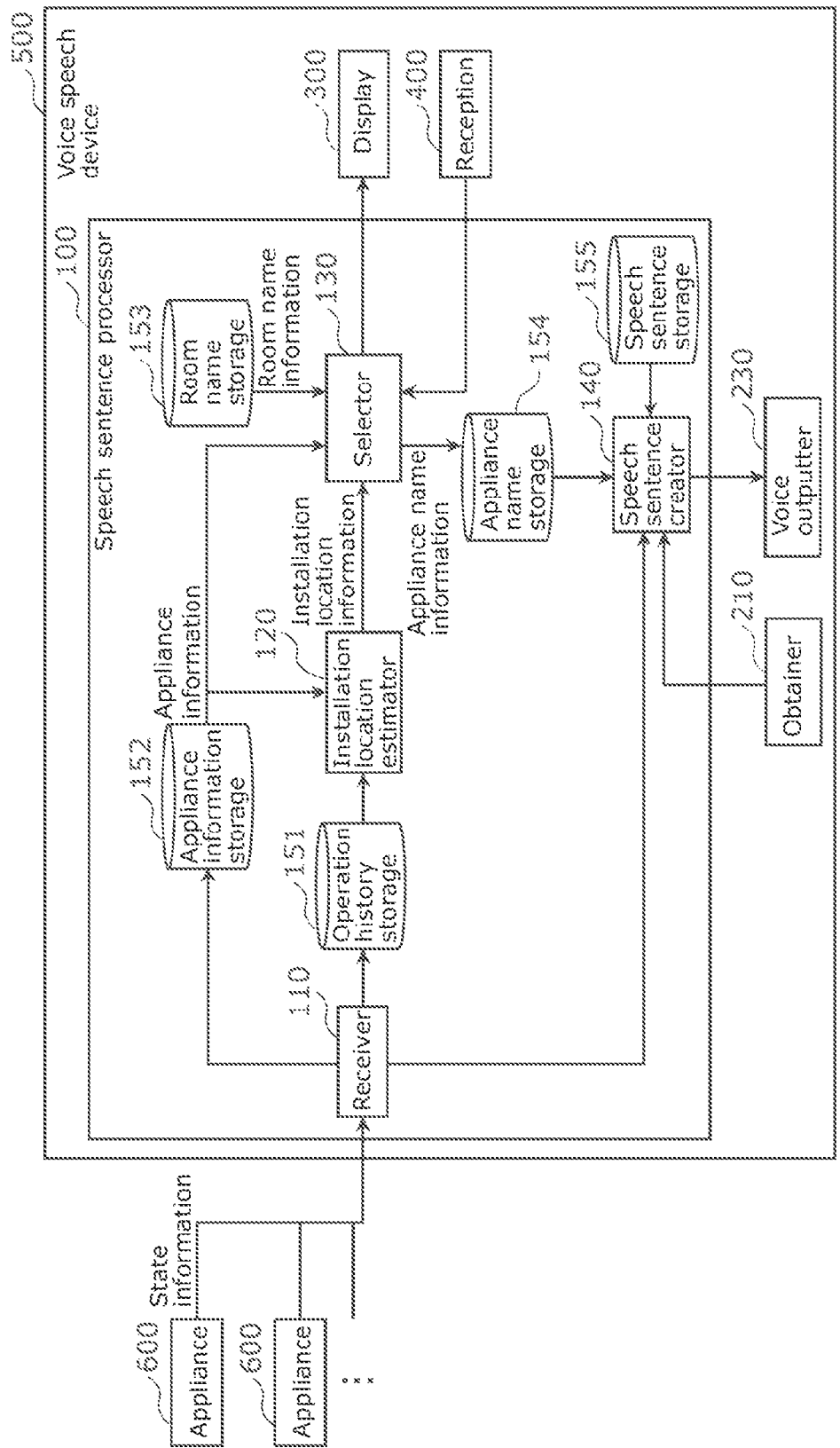
FIG. 1 is a block diagram showing a configuration of a voice speech device according to an embodiment.

FIG. 1 is a block diagram showing a configuration of voice speech device 500 according to an embodiment.

Voice speech device 500 notifies a user of information (notifying information) by voice, when information is outputted from appliance 600. Examples of the information include: information indicating that processing state is changed; information notifying breakdown; information suggesting a user to change a component, such as a filter; information for informing a user of functions that appliance 600 has (recommended information); and so on.

Appliance 600 is an electric appliance that can output information relating to appliance 600 (information source appliance), and includes, for example, a refrigerator, a washing machine, a microwave oven, a lighting system, an intercommunication system, and so on. Appliance 600 sends, to voice speech device 500, information including, for example, identification information that is a unique identifier indicating appliance 600, appliance information indicating performance (specification) of appliance 600, and state information indicating a state of appliance 600, such as processing (operating) state and breakdown.

Appliance 600 includes a communication interface for communicating with voice speech device 500, an executor that performs cooling, washing, heating, and so on, a detector embodied by a sensor or the like for detecting a state of appliance 600, a controller embodied by a memory, a processor that controls various processing of appliance 600, and so on.

Voice speech device 500 is an electric appliance (e.g., a so-called household electric appliance) including an air conditioner, a television (TV), an autonomous running cleaner (a so-called a robot vacuum cleaner), and is an appliance provided with a component that can output voice, such as a speaker (a household electric appliance equipped with a speaker). It should be noted that voice speech device 500 may be a terminal device, such as a smartphone and a tablet terminal. Voice speech device 500 outputs, to a user, voice for explaining a state of appliance 600, when receiving the state information indicating the state of appliance 600.

Although two appliances 600 are shown in FIG. 1, the number of appliance 600 that communicates with voice speech device 500 is not particularly limited and may be one or multiple.

Voice speech device 500 is connected to each of one or more appliances 600 in a communicable manner.

Each of appliance 600 and voice speech device 500 is placed inside a house where a user lives in.

Voice speech device 500 includes speech sentence processor 100, obtainer 210, voice outputter 230, display 300, and receptor 400.

Speech sentence processor 100 obtains the state information from one or more appliances 600, determines a name of appliance 600 from which the state information is obtained, based on the obtained state information, and causes voice outputter 230 to output a speech sentence including the determined name.

Speech sentence processor 100 includes receiver 110, installation location estimator 120, selector 130, speech sentence creator 140, operation history storage 151, appliance information storage 152, room name storage 153, appliance name storage 154, and speech sentence storage 155.

Receiver 110 is a communication interface for receiving the state information from appliance 600. Receiver 110 is embodied by a connector or the like to which a communication wire is connected when voice speech device 500 communicates with appliance 600 via a wired communication. Receiver 110 is also embodied by an antenna and a wireless communication circuit or the like when voice speech device 500 communicates with appliance 600 via a wireless communication.

Installation location estimator 120 serves as a processor that estimates (calculates) an installation location of appliance 600, based on information obtained from appliance 600. Specifically, installation location estimator 120 estimates an installation location of appliance 600, based on operation information (history information) indicating an operation history of appliance 600 and appliance information. For example, installation location estimator 120 estimates an installation location of appliance 600, based on the operation information of appliance 600, which is stored in operation history storage 151, and the appliance information of appliance 600, which is stored in appliance information storage 152.

A timing at which installation location estimator 120 estimates an installation location of appliance 600 may be optional. The timing may be a timing at which voice speech device 500 receives the appliance information and/or the state information from appliance 600, and may be a timing at which an instruction of setting an appliance name is accepted from a user, for example.

Furthermore, if appliance 600 is an autonomous running vacuum cleaner, installation location estimator 120 estimates at least one of: the number of legs of furniture placed in a space where appliance 600 runs; and a layout of the furniture, based on traveling route information that indicates a traveling route (cleaning route) of appliance 600, and further estimates an installation location of appliance 600 based on the estimated result.

The autonomous running vacuum cleaner autonomously runs in a predetermined space, such as a living space, to perform cleaning. The autonomous running vacuum cleaner creates a map (map information) of the predetermined space where cleaning is performed, using simultaneous localization and mapping (SLAM), and travels with estimating a self position in the created map so as to perform cleaning. In this situation, the autonomous running vacuum cleaner stores a trajectory of the self position (i.e., traveling route) estimated while running, for example. Voice speech device 500 receives the map (map information) created by the autonomous running vacuum cleaner and information indicating the traveling route (traveling route information), and stores the received information in operation history storage 151 as state information (operation information) of the autonomous running vacuum cleaner, for example. Accordingly, if appliance 600 is the autonomous running vacuum cleaner, and the operation history of appliance 600 contains the traveling route information indicating the traveling route of appliance 600, installation location estimator 120 estimates at least one of: the number of legs of furniture placed in a space where appliance 600 travels; and a layout of the furniture, based on the traveling route information that indicates a traveling route of appliance 600, and estimates an installation location of appliance 600 based on the estimated result.

Specific processing in the estimation of an installation location of appliance 600, which is performed by installation location estimator 120, is described later.

Installation location estimator 120 outputs information indicating the estimated installation location of appliance 600 (installation location information), to selector 130.

Selector 130 is a processor which causes display 300 to display one or more candidates for a name provided to appliance 600, and accepts the selected one name among one or more candidates for the name. Specifically, selector 130 causes display 300 to display candidates for the appliance name of appliance 600, which include a name of room that is the installation location estimated by installation location estimator 120. Selector 130 causes appliance name storage 154 to store information indicating an appliance name selected (designated) by a user via receptor 400, as the appliance name information. For example, selector 130 obtains room-name information indicating a room name according to the installation location from room name storage 153, based on the installation location estimated by installation location estimator 120. Furthermore, selector 130 determines (creates) candidates for the appliance name of appliance 600, which include a room name indicated by the obtained room name information, and causes display 300 to display candidates for the determined appliance name. As mentioned above, selector 130 creates a name that contains information indicating the installation location of appliance 600 as at least one candidate among one or more candidates for the name, and causes display 300 to display one or more candidates including the at least one candidate that has been created.

The appliance name created by selector 130 may be optional. If the installation location indicated by the installation location information is a "bedroom" and a type (classification) of the appliance indicated by the appliance information is an "air conditioner", for example, selector 130 determines "air conditioner in bedroom" as the candidate for the appliance name. In this case, selector 130 causes display 300 to display a character string of "the air conditioner in the bedroom", for example. A user examines the candidate for the appliance name displayed in display 300, and operates receptor 400 to designate the appliance name. Selector 130 determines the appliance name based on the instruction accepted from the user, and causes appliance name storage 154 to store information indicating the appliance name determined (appliance name information).

It should be noted that selector 130 may cause display 300 to display a plurality of candidates for the appliance name. For example, voice speech device 500 further includes a storage (candidate information storage) that stores candidate information indicating one or more candidates for the appliance name, which are optionally set in advance. Selector 130 may cause display 300 to display the determined candidate in the storage and one or more candidates for the appliance name, which are stored in the candidate information storage.

Selector 130 may determine a plurality of candidates for the appliance name. If the installation location indicated by the installation location information is a "bedroom" and the type of the appliance indicated by the appliance information is an "air conditioner", for example, selector 130 may determine both "air conditioner in bedroom" and "air conditioning facility in bedroom" as the candidates for the appliance name.

For example, selector 130 calculates the number of appliance 600 of a same type as appliance 600 for which the name is provided (target appliance) among a plurality of appliances 600, determines the number of letters of the candidate for the name of the target appliance based on the calculated number of appliance 600 of the same type, and creates at least one candidate so as to have the number same as the determined number of letters.

When selector 130 creates candidates for the name of the target appliance, and the number of the appliances of the same type as the target appliance in the appliance information stored in appliance information storage 152 is two, for example, selector 130 adopts the room name from "living room, bedroom, kitchen, and Japanese room", and so on. Meanwhile, when selector 130 creates candidates for the name of the target appliance, and the number of the appliances of the same type as the target appliance in the appliance information stored in appliance information storage 152 is three, for example, selector 130 adopts the room name from "living room, bedroom, daidokoro, and ozashiki", and so on. Thus, when the number of the appliances of the same type as the target appliance is two, for example, selector 130 determines the room name as "shinshitsu", and when the number is three, selector 130 determines the room name as "bedroom" having a character string in Japanese longer than that of shinshitsu for the case of the two appliances. Alternatively, selector 130 determines the room name as "kitchen" when the number of the appliances of the same type as the target appliance is two, and determines the room name as "daidokoro having a character string in Japanese longer than that of kitchen for the case of the two appliances when the number is three, for example. Alternatively, selector 130 determines, for example, the room name as "washitsu" when the number of the appliances of the same type as the target appliance is two, and determines the room name as "ozashiki", when the number is three. The name "ozashiki" has a character string in Japanese longer than that of washitsu for the case of two appliances. Elongating the character string of the room name is to increase the number of letters, syllables, or vowel voice, when the room name is expressed by Hiragana or Katakana, for example.

Selector 130 may have a receptor, such as a touch panel, which accepts an input from a user, and may accept the selection of the appliance name, and so on, from the user via the receptor.

Speech sentence creator 140 is a processor that creates a sentence of voice (speech sentence) to be outputted from voice outputter 230. Specifically, speech sentence creator 140 creates a speech sentence for notifying the state of appliance 600, based on the state information of appliance 600, which is received by receiver 110 (a first state information). Such a speech sentence contains a single name accepted by selector 130 via receptor 400 and so on, for example. Speech sentence creator 140 creates a speech sentence containing the appliance name of appliance 600, when the state information is received from appliance 600 via receiver 110, for example. Speech sentence creator 140 obtains the appliance name information from appliance name storage 154 based on the obtained state information, and creates a speech sentence based on the state information and the appliance name information.

When speech sentence creator 140 obtains the state information indicating that: appliance 600 is an air conditioner; the appliance name of appliance 600 is "air conditioner in bedroom"; and the air conditioner stops the operation, for example, speech sentence creator 140 creates a speech sentence that "air conditioner in bedroom stops operation". As such, speech sentence creator 140 creates speech sentences including "air conditioner in living room starts cooling", "air conditioner in bedroom stops operation", and so on based on the appliance name information and state information of appliance 600. Speech sentence creator 140 obtains a voice file of voice corresponding to the created speech sentence from speech sentence storage 155, and outputs the obtained voice file to voice outputter 230.

Speech sentence storage 155 stores, for example: a speech sentence (a character string) indicating a room name and a voice file of the room name; a character string indicating the appliance name and a voice file corresponding to the character string; and a character string corresponding to the state information and a voice file of the character string, which are associated with one another. Speech sentence creator 140 obtains the appliance name information from appliance name storage 154 in accordance with the obtained state information, and creates a speech sentence by combining a plurality of character strings stored in speech sentence storage 155, based on the state information and the appliance name information. Speech sentence creator 140 obtains a plurality of voice files corresponding to a plurality of character strings contained in the created speech sentence from speech sentence storage 155 and combines the files, thereby creating a voice file corresponding to the speech sentence, and outputting the created voice file to voice outputter 230.

When selector 130 accepts the selection of a single name from one or more name candidates, for example, speech sentence creator 140 creates a speech sentence containing the single name accepted by selector 130, as described above. On the other hand, if selector 130 has not yet accept the selection of a single name from one or more name candidates, for example, speech sentence creator 140 may create a speech sentence containing information indicating an installation location of the target appliance, which is estimated by installation location estimator 120. For example, when receiver 110 receives the state information of appliance 600, speech sentence creator 140 determines whether the selection of the name of appliance 600 is accepted. For example, if the selection of a name of appliance 600 is accepted, speech sentence creator 140 creates a speech sentence containing a content indicated by the state information and the name. On the other hand, if the selection of a name of appliance 600 is not accepted, speech sentence creator 140 creates a speech sentence containing a content indicated by the state information and information indicating an installation location of appliance 600 (e.g., a location name, such as "a living room"), which is estimated by installation location estimator 120.

For example, it is assumed that installation location estimator 120 estimating the installation location of appliance 600 as a "living room". In this case, if the appliance name of appliance 600 has been set, speech sentence creator 140 creates a speech sentence that "the air conditioner in the living room starts cooling", and so on, for example. If the appliance name of appliance 600 has not been set, speech sentence creator 140 may create a speech sentence that "the air conditioner in a room suspected to be the living room starts cooling", and so on, for example. As such, speech sentence creator 140 may create a speech sentence using "suspected to be", which is different from those created when the appliance name has been set.

The processors, such as installation location estimator 120, selector 130, and speech sentence creator 140, are each embodied by a memory, a control program stored in the memory, a central processing unit (CPU) or such a processor executing the control program. These processors may be embodied by a single memory and a single processor, or may be embodied by a plurality of memories and a plurality of processors in combinations different from each other or combinations of any memories and processors. In addition, these processors may be, for example, embodied by a dedicated electronic circuit.

Operation history storage 151 is a storage that stores operation information indicating an operation history of appliance 600. Specifically, operation history storage 151 stores the state information received by receiver 100 as the operation history. Operation history storage 151 stores, as the operation information: identification information uniquely indicating appliance 600; the state information; and date and time at which a state indicated by the state information is changed or date and time at which the state information is received, with associating them with one another.

Appliance information storage 152 stores appliance information that is the information of appliance 600.

The appliance information is, for example, information received from appliance 600 via receiver 110, and includes identification information of appliance 600, type information indicating a type of appliance 600, such as an air conditioner, a television, an autonomous running vacuum cleaner, and so on, performance information indicating performance of appliance 600, and so on. It should be noted that the appliance information may be obtained from a user via receptor 400 or the like and stored in appliance information storage 152.

Room name storage 153 stores room name information that corresponds to information indicating the room name (e.g., information indicated by a character string). The room name information is optionally set by a user as "living room", "bedroom", "kitchen", "Japanese room", and so on, in advance, and is stored in room name storage 153.

Appliance name storage 154 stores appliance name information that corresponds to information indicating the appliance name determined based on an instruction accepted by a user (e.g., information indicated by a character string), for example.

Speech sentence storage 155 stores a voice file corresponding to a speech sentence. In speech sentence storage 155, a speech sentence and a voice file are associated with each other and stored in advance, for example.

Each of operation history storage 151, appliance information storage 152, room name storage 153, operation history storage 154, speech sentence storage 155, and so on, is embodied by a hard disk drive (HDD), a flush memory, or the like, for example. These storages may be embodied by a single, such as a single HDD, or may be embodied by a plurality of storages, such as a plurality of HDDs.

Obtainer 210 is a processor that obtains status information (second state information) indicating a state of voice speech device 500. When a sensor or the like (not shown) provided in voice speech device 500 detects a change in the state, obtainer 210 outputs voice based on the detection result. For example, if voice speech device 500 is an autonomous running vacuum cleaner, obtainer 210 obtains information indicating the change in the state of own device, such as a change regarding start of cleaning. Obtainer 210 outputs the obtained state information to speech sentence creator 140.

Here, when obtainer 210 obtains the state information (the second state information) of voice speech device 500, voice speech creator 140 may create a speech sentence that contains the name of voice speech device 500, and may create a speech sentence that does not contain the name of voice speech device 500. In other words, when outputting voice indicating the state of the own device, voice speech device 500 outputs, using the voice, a speech sentence that does not contain the name.

Obtainer 210 is embodied by, for example, a memory, a control program stored in the memory, a processor, such as CPU, which executes the control program. Obtainer 210 may be embodied by a dedicated electronic circuit, for example. Each of the processors including obtainer 210, installation location estimator 120, selector 130, and speech sentence creator 140 may be embodied by a single memory and a single processor, or may be embodied by, for example, a memory and a processor in a combination different from each other or a combination of any memory and any processor. These processors may be, for example, embodied by a dedicated electronic circuit.

Voice outputter 230 is a speaker that outputs voice corresponding to the speech sentence created by speech sentence creator 140. For example, voice outputter 230 reproduces a voice file obtained from speech sentence creator 140, so as to notify, by the voice, a user of speech sentences including "the air conditioner in the living room starts cooling", "the air conditioner in the bedroom stops the operation", and so on. Voice outputter 230 may naturally include a further component, such as an amplifier.

Display 300 displays an image in accordance with an instruction from selector 130.

Receptor 400 accepts an instruction from a user, and outputs information indicating the accepted instruction to selector 130. Receptor 400 is, for example, a mouse, a keyboard, a touch panel, an operation console, or the like.

It should be noted that display 300 and receptor 400 may be integrally embodied, as the touch panel.

Specific Example of Installation Location Estimation Processing

Subsequently, a specific example of processing of estimating an installation location of appliance 600, which is performed by installation location estimator 120.

First Example

Figure 2:
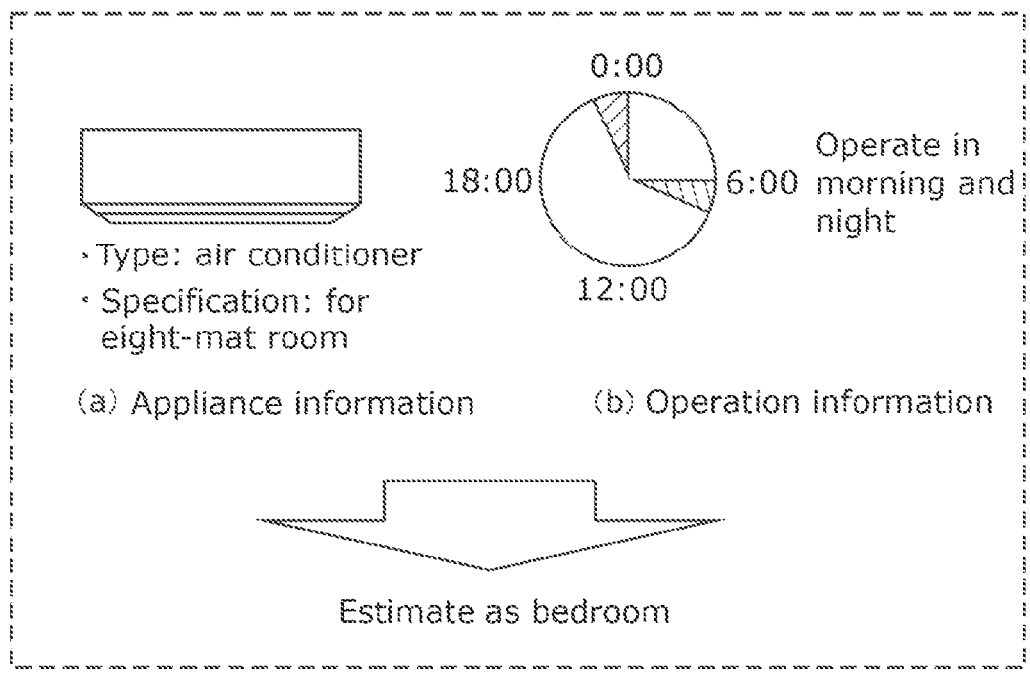
FIG. 2 is a diagram for describing a first example of processing in which the voice speech device according to the embodiment estimates an installation location of an appliance.

FIG. 2 is a diagram for describing a first example of processing in which voice speech device 500 according to the present embodiment estimates an installation location of appliance 600. In the example shown in FIG. 2, appliance 600 is an air conditioner having the performance for an eight-mat room. It should be noted that "Type: air conditioner" and "Performance: eight-mat room" shown in (a) of FIG. 2 is an example of the appliance information. In addition, it is assumed that appliance 600 operates in time periods of 6:00 to 7:00 and 23:00 to 0:00, as shown in (b) of FIG. 2. It should be noted that information indicating the operation time periods shown in (b) FIG. 2 is an example of the operation information (state information). In this case, installation location estimator 120 estimates that the installation location of appliance 600 is a bedroom, from a fact that the type of appliance 600 is an air conditioner, the performance thereof is for an eight-mat room, and appliance 600 is used in the morning and night.

Second Example

Figure 3:
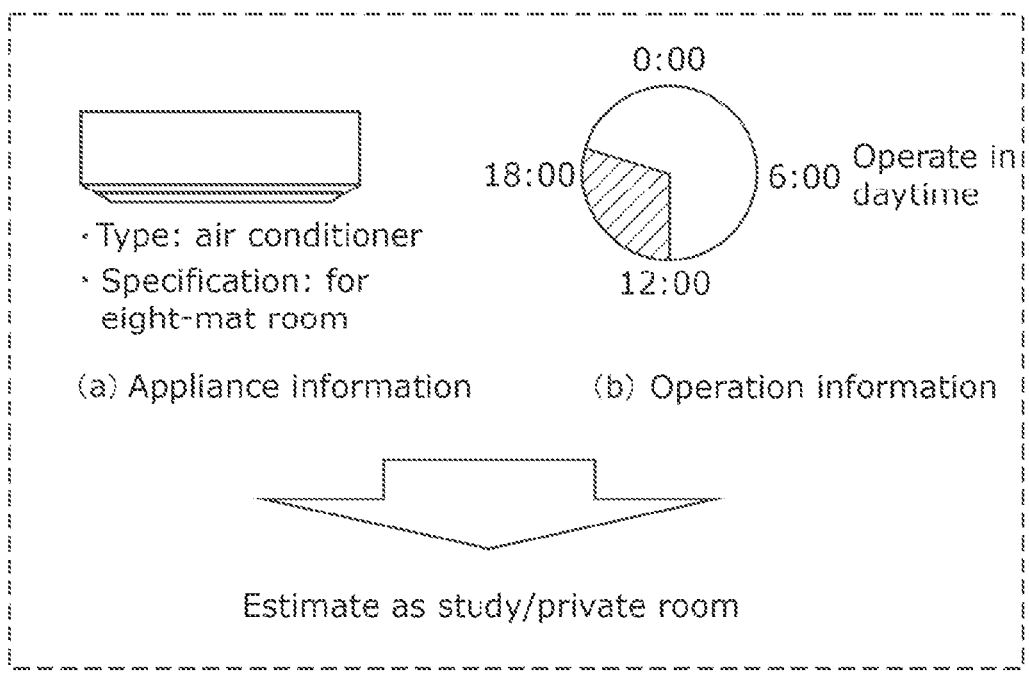
FIG. 3 is a diagram for describing a second example of the processing in which the voice speech device according to the embodiment estimates the installation location of the appliance.

FIG. 3 is a diagram for describing a second example of processing in which voice speech device 500 according to the embodiment estimates an installation location of appliance 600. In the example shown in FIG. 3, appliance 600 is an air conditioner having the performance for eight-mat room. It should be noted that "Type: air conditioner" and "Performance: eight-mat room" shown in (a) of FIG. 3 is an example of the appliance information. In addition, it is assumed that appliance 600 operates in a time period of 12:00 to 19:00, as shown in (b) of FIG. 3. It should be noted that information indicating the operation time period shown in (b) FIG. 3 is an example of the operation information (state information). In this case, installation location estimator 120 estimates that the installation location of appliance 600 is a study room or a private room, from facts that the type of appliance 600 is an air conditioner, the performance thereof is for eight-mat room, and appliance 600 is used during the daytime. As such, installation location estimator 120 may estimate a single installation location, or may estimate a plurality of candidates for the installation location.

Third Example

Figure 4:
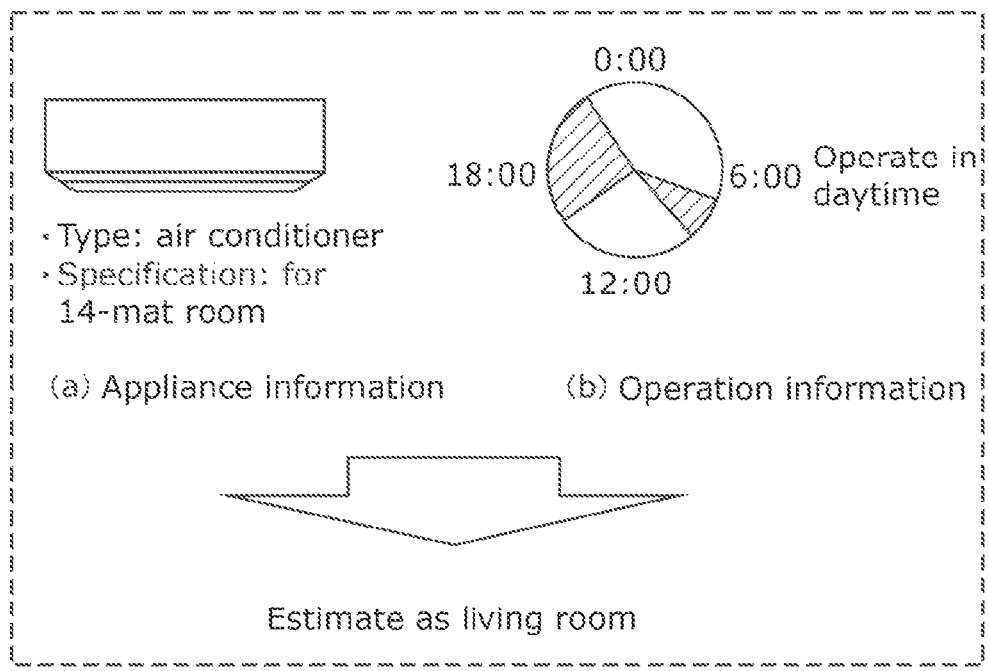
FIG. 4 is a diagram for describing a third example of the processing in which the voice speech device according to the embodiment estimates the installation location of the appliance.

FIG. 4 is a diagram for describing a third example of processing in which voice speech device 500 according to the embodiment estimates an installation location of appliance 600. In the example shown in FIG. 4, appliance 600 is an air conditioner having the performance for 14-mat room. It should be noted that "Type: air conditioner" and "Performance: 14-mat room" shown in (a) of FIG. 4 is an example of the appliance information. In addition, it is assumed that appliance 600 operates in time periods of 7:00 to 9:00 and 16:00 to 20:00, as shown in (b) of FIG. 4. It should be noted that information indicating an operation time period shown in (b) FIG. 4 is an example of the operation information (state information). In this case, installation location estimator 120 estimates that the installation location of appliance 600 is a living room, from facts that the type of appliance 600 is an air conditioner, the performance thereof is for 14-mat room, and appliance 600 is used during the daytime.

The appliance information may include information indicating a type of appliance 600 and information indicating performance of appliance 600. The appliance information may include information by which performance and a type of appliance 600, such as a model number, are discriminative. The appliance information may include the information indicating a type of appliance 600, the information indicating performance of appliance 600, and the information by which performance and a type of appliance 600, such as a model number, are discriminative.

Fourth Example

Figure 5:
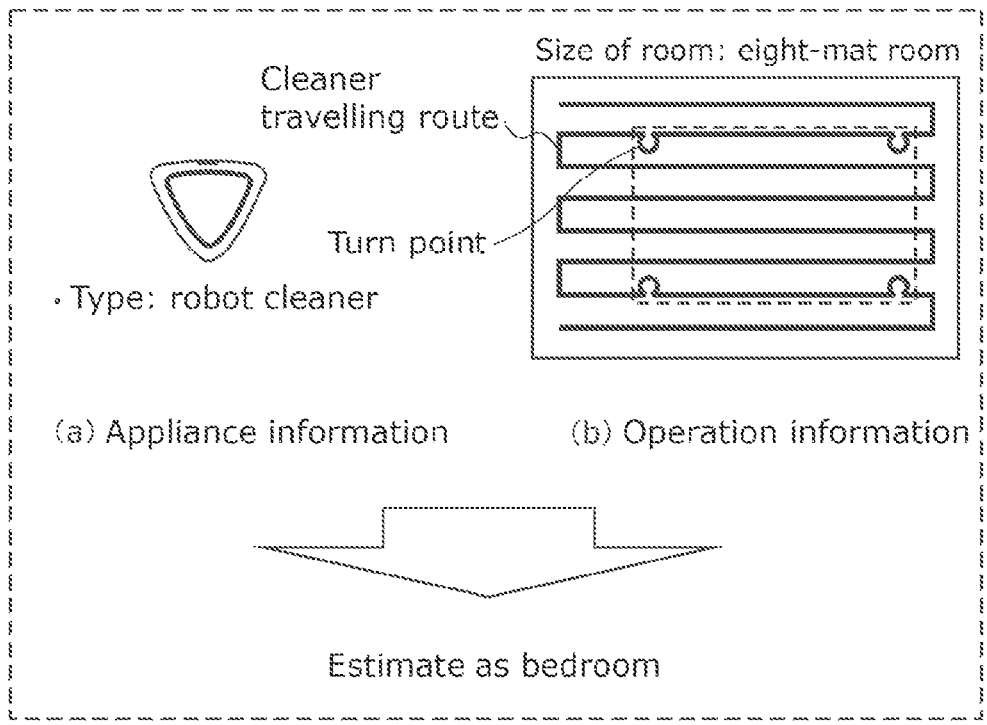
FIG. 5 is a diagram for describing a fourth example of the processing in which the voice speech device according to the embodiment estimates the installation location of the appliance.

FIG. 5 is a diagram for describing a fourth example of processing in which voice speech device 500 according to the embodiment estimates an installation location of appliance 600. In the example shown in FIG. 5, appliance 600 is a robot cleaner. It should be noted that "Type: robot cleaner" shown in (a) of FIG. 5 is one example of the appliance information. In addition, it is assumed that appliance 600 is operated to perform cleaning with moving along a cleaning trajectory shown in (b) of FIG. 5. It should be noted that information indicating a size (a layout) of the room shown in (b) of FIG. 5 (e.g., the map information as described above) and information indicating the cleaning trajectory are examples of the operation information (state information).

For example, installation location estimator 120 extracts a turn point where the cleaner does not run linearly, based on the cleaning trajectory. The turn point is included in the cleaning trajectory. In the present example, it is assumed that installation location estimator 120 extracts four turn points. Installation location estimator 120 calculates a rectangle (e.g., a rectangle formed by sides including a side parallel to any one of sides defining an outer periphery of a room) having the four turn points as four corners (vertices), and estimates (calculates) a size of the rectangular (e.g., a dimension, a length of each side, an aspect ratio, and so on). For example, obstructions including legs of furniture, such as a chair and a bed, which disturb the travel of the robot cleaner, may be placed at areas where the robot cleaner does not travel linearly, as in the turn points. Installation location estimator 120 estimates (calculates) the obstructions placed on positions corresponding to the rectangular, based on the calculated size of the rectangular. In this case, installation location estimator 120 estimates, for example, that a bed is placed in the position corresponding to the rectangular. From this result, the type of appliance 600 is a robot cleaner, the dimension of the room cleaned by the robot cleaner corresponds to an eight-mat room, and a bed is placed in the room. Accordingly, installation location estimator 120 estimates the installation location of appliance 600 is a bedroom. Accordingly, installation location estimator 120 may estimates the installation location of appliance 600 using information indicating the number of legs, the position of furniture, and so on.

It should be noted that the size of a room is calculated based on the map information, for example. The robot cleaner sometimes runs through a plurality of rooms for cleaning. In this case, installation location estimator 120 may voluntarily estimate the installation location of the robot cleaner from the plural rooms. Installation location estimator 120 may estimate a plurality of installation locations as the installation locations respectively, for example. In this case, selector 130 may create a plurality of candidates for the appliance name, each of which includes the respective one of the plural installation locations estimated by installation location estimator 120, as the candidates for the name of appliance 600. Alternatively, installation location estimator 120 may estimate a cleaning start site of the robot cleaner (e.g., a location where a battery charger to which the robot cleaner is connected is placed), as the installation location.

Fifth Example

Figure 6:
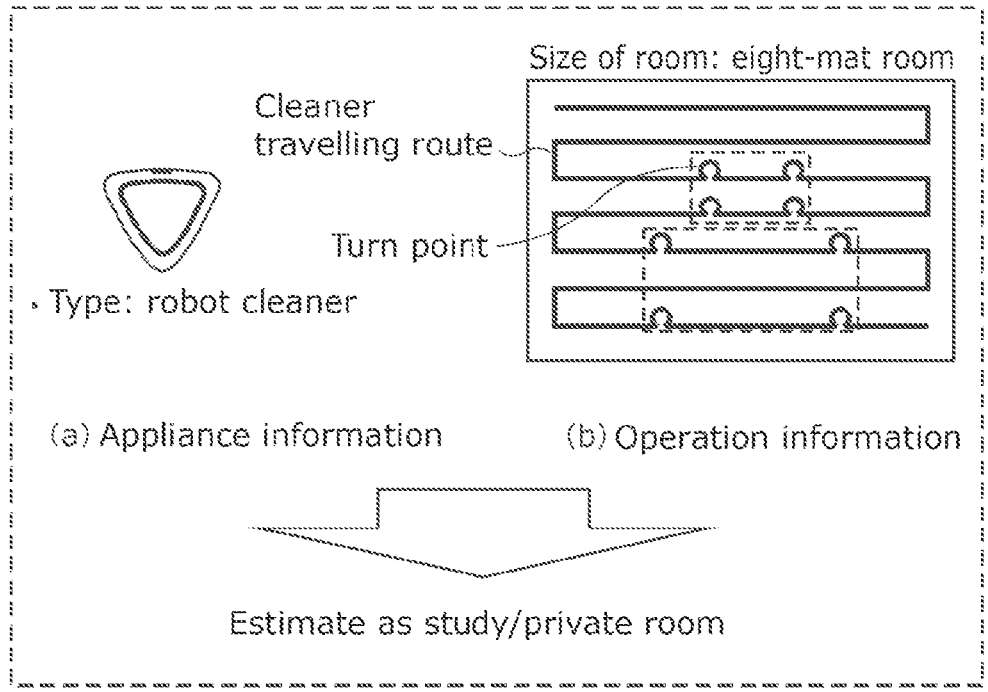
FIG. 6 is a diagram for describing a fifth example of the processing in which the voice speech device according to the embodiment estimates the installation location of the appliance.

FIG. 6 is a diagram for describing a fifth example of processing in which voice speech device 500 according to the embodiment estimates the installation location of appliance 600. In the example shown in FIG. 6, appliance 600 is a robot cleaner. It should be noted that "Type: robot cleaner" shown in (a) of FIG. 6 is one example of the appliance information. In addition, it is assumed that appliance 600 is operated to perform cleaning with moving along the cleaning trajectory shown in (b) of FIG. 6. It should be noted that the information indicating a size (a layout) of the room shown in (b) of FIG. 6 and information indicating the cleaning trajectory are examples of the operation information (state information).

For example, installation location estimator 120 extracts a turn point where the cleaner does not run linearly, based on the cleaning trajectory. The turn point is included in the cleaning trajectory. In the present example, it is assumed that installation location estimator 120 extracts eight turn points. Installation location estimator 120 calculates two rectangles each having the four turn points as four corners (vertices), and estimates (calculates) a size of each of the two rectangles. In this case, installation location estimator 120 estimates that a chair and a desk are placed in the positions respectively corresponding to the two rectangles, for example. From this result, the type of appliance 600 is a robot cleaner, the room cleaned by the robot cleaner has a size corresponds to an eight-mat room, and a chair and a desk are placed in the room. Accordingly, installation location estimator 120 estimates the installation location of appliance 600 is a study or a private room.

Sixth Example

Figure 7:
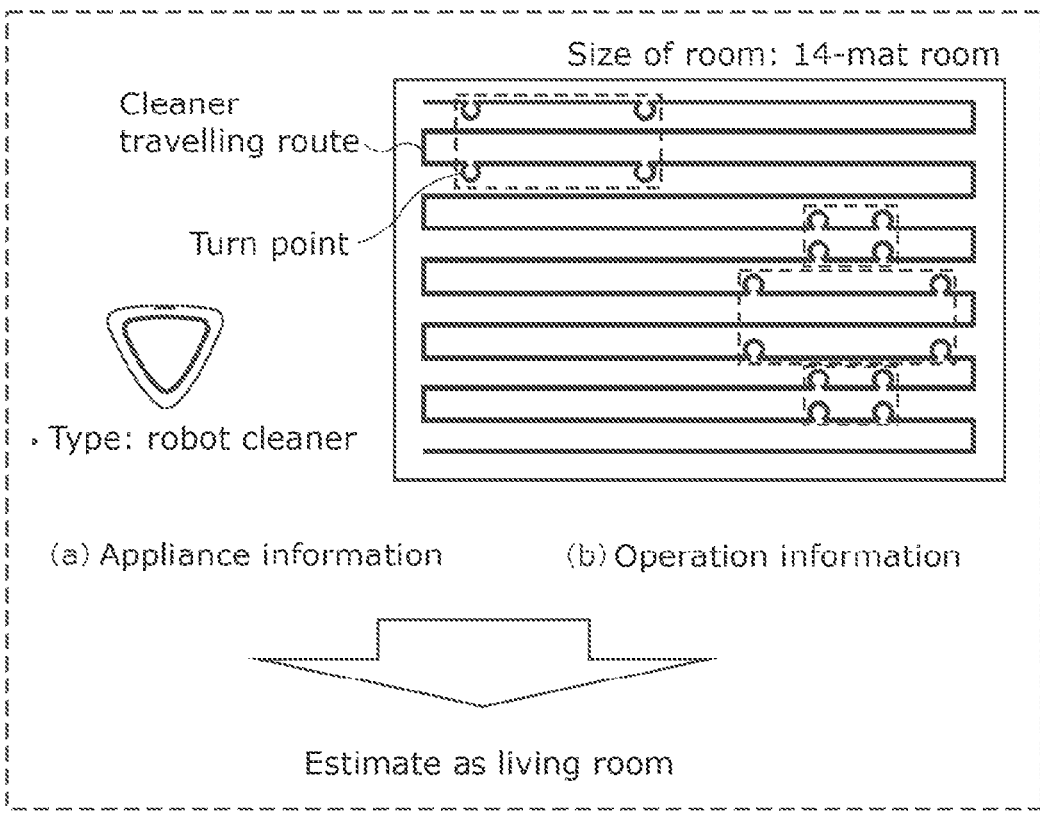
FIG. 7 is a diagram for describing a sixth example of the processing in which the voice speech device according to the embodiment estimates the installation location of the appliance.

FIG. 7 is a diagram for describing a sixth example of processing in which voice speech device 500 according to the embodiment estimates an installation location of appliance 600. In the example shown in FIG. 7, it is assumed that appliance 600 is a robot cleaner. It should be noted that "Type: robot cleaner" shown in (a) of FIG. 7 is one example of the appliance information. In addition, it is assumed that appliance 600 is operated to perform cleaning with moving along a cleaning trajectory shown in (b) of FIG. 7. It should be noted that the information indicating a size (a layout) of the room shown in (b) of FIG. 7 and information indicating the cleaning trajectory are examples of the operation information (state information).

For example, installation location estimator 120 extracts a turn point where the cleaner does not run linearly, based on the cleaning trajectory. The turn point is included in the cleaning trajectory. In the present example, it is assumed that installation location estimator 120 extracts 16 turn points. Installation location estimator 120 calculates four rectangles each having the four turn points as four corners (vertices), and estimates (calculates) a size of each of the four rectangles. In this case, installation location estimator 120 estimates that a chair, a desk, a sofa, and so on are placed in the positions respectively corresponding to the four rectangles. From this result, the type of appliance 600 is a robot cleaner, the room cleaned by the robot cleaner has a size corresponding to 14-mat room, and a chair, a desk, a sofa, and so on are placed in the room. Accordingly, installation location estimator 120 estimates the installation location of appliance 600 is a living room.

Seventh Example

Figure 8:
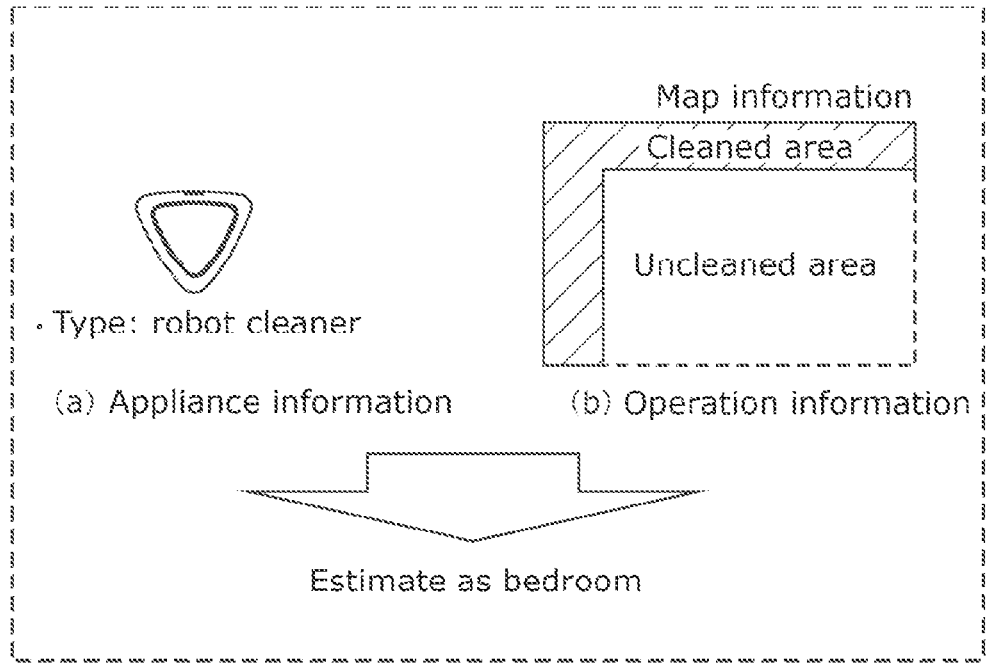
FIG. 8 is a diagram for describing a seventh example of the processing in which the voice speech device according to the embodiment estimates the installation location of the appliance.

FIG. 8 is a diagram for describing a seventh example of processing in which voice speech device 500 according to the embodiment estimates an installation location of appliance 600. In the example shown in FIG. 8, it is assumed that appliance 600 is a robot cleaner. It should be noted that "Type: robot cleaner" shown in (a) of FIG. 8 is one example of the appliance information. In addition, it is assumed that appliance 600 runs in a hatched area (cleaned area), and does not run in an unhatched area (uncleaned area), as shown in (b) of FIG. 8. It should be noted that information indicating the cleaned area shown in (b) of FIG. 8 is an example of the operation information (state information).

For example, installation location estimator 120 estimates, based on the information indicating the cleaned area, the size of a room, the presence/absence of an obstruction, a type of the obstruction if any. For example, installation location estimator 120 calculates a minimum rectangle covering all the cleaned area, if the cleaned area is not rectangle. Alternatively, installation location estimator 120 estimates (calculates) the size of a room from the size of the calculated rectangle, for example. In this case, installation location estimator 120 calculates that the room has a size corresponding to an eight-mat room, for example. In addition, Installation location estimator 120 estimates (calculates) the uncleaned area from the calculated rectangle and the cleaned area, for example. The obstruction or the like which disturbs the travel of the robot cleaner may be placed at an area where the robot cleaner does not travel, as in the uncleaned area, for example. Installation location estimator 120 estimates (calculates) the obstruct placed on the position of the uncleaned area, based on the calculated size and shape of the uncleaned area. In this case, installation location estimator 120 estimates that a bed is placed in the uncleaned area, for example. From this result, the type of appliance 600 is a robot cleaner, the room cleaned by the robot cleaner has a size corresponding to an eight-mat room, and a bed is placed in the room. Accordingly, installation location estimator 120 estimates the installation location of appliance 600 is a bedroom. Accordingly, installation location estimator 120 may estimate the installation location of appliance 600 using the layout of furniture.

Eighth Example

Figure 9:
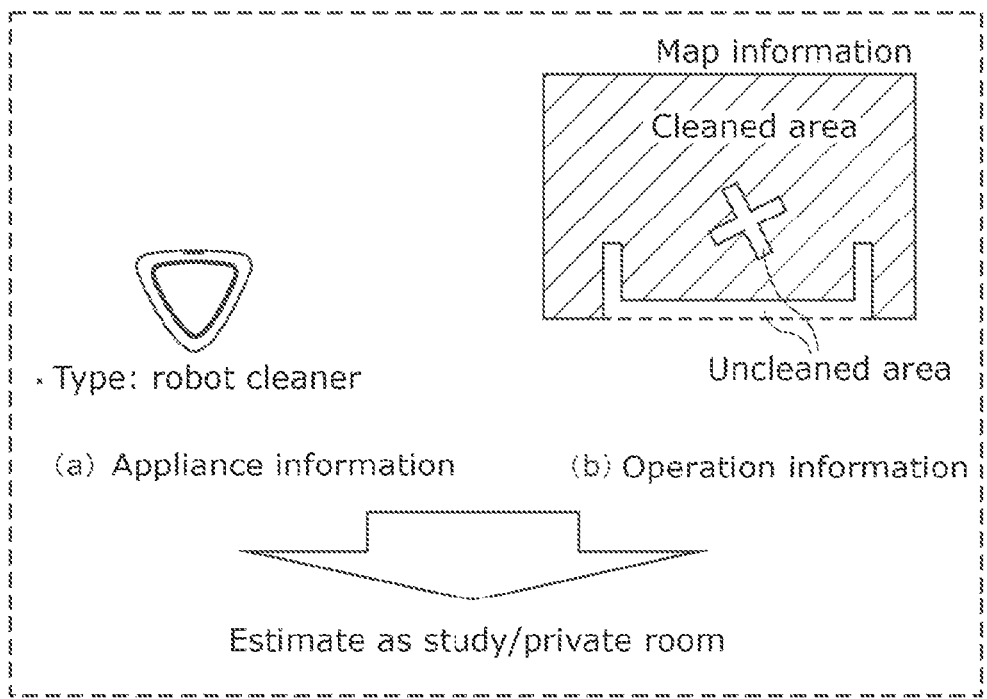
FIG. 9 is a diagram for describing an eighth example of the processing in which the voice speech device according to the embodiment estimates the installation location of the appliance.

FIG. 9 is a diagram for describing an eighth example of processing in which voice speech device 500 according to the embodiment estimates an installation location of appliance 600. In the example shown in FIG. 9, it is assumed that appliance 600 is a robot cleaner. It should be noted that "Type: robot cleaner" shown in (a) of FIG. 9 is one example of the appliance information. In addition, it is assumed that appliance 600 runs in a hatched area (cleaned area), and does not run in an unhatched area (uncleaned area), as shown in (b) of FIG. 9. It should be noted that information indicating the cleaned area shown in (b) of FIG. 9 is an example of the operation information (state information).

For example, installation location estimator 120 calculates a minimum rectangle covering all the cleaned area, if the cleaned area is not rectangle. Installation location estimator 120 estimates (calculates) the size of a room from the calculated size of the rectangle, for example. In this case, installation location estimator 120 calculates the room to have a size corresponding to an eight-mat room, for example. Furthermore, installation location estimator 120 estimates (calculates) the uncleaned area from the calculated rectangle and the cleaned area, for example. In addition, installation location estimator 120 estimates (calculates) the obstruction placed in the uncleaned area, based on the calculated size and shape of the uncleaned area. In this case, installation location estimator 120 estimates that a chair and a desk are placed in the uncleaned areas, for example. From this result, the type of appliance 600 is a robot cleaner, the room cleaned by the robot cleaner has a size corresponding to an eight-mat room, and a chair and a desk are placed in the room. Accordingly, installation location estimator 120 estimates the installation location of appliance 600 is a study or a private room.

Specific Example of Display Processing

Subsequently, an image which selector 130 causes display 300 to display, for displaying candidates for the appliance name, determined by selector 130, is described.

Figure 10:
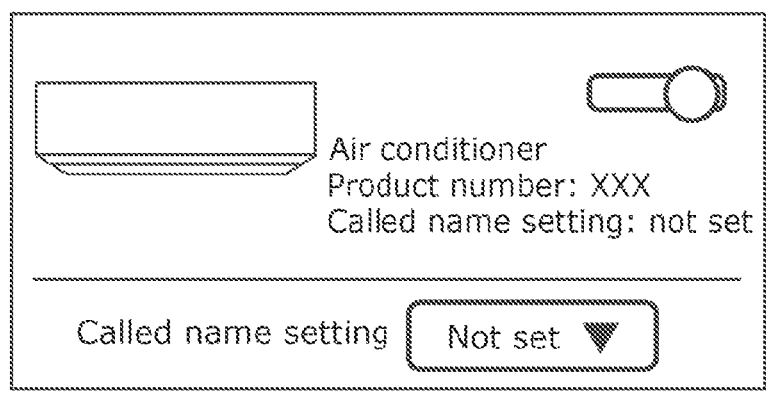
FIG. 10 is a diagram showing a specific example of an image which the voice speech device according to the embodiment causes a display device to display.

FIG. 10 is a diagram showing a specific example of an image which voice speech device 500 according to the present embodiment causes display 300 to display. Specifically, FIG. 10 shows a specific example of an image displayed by display 300, when selector 130 accepts the selection of the appliance name from a user.

The image contains information indicating a type of appliance 600, information indicating a product number, and information indicating the appliance name of appliance 600, for example. In the present example, an image showing a case where the appliance name is not set yet is indicated.

A user operates receptor 400 to select a black down-pointing triangle in FIG. 10, for example. When accepting the selection, selector 130 may cause display 300 to display one or more candidates for the appliance name, which include the candidate for the appliance name determined by selector 130.

A user further operates receptor 400, for example, to select one candidate among one or more candidates for the appliance name, which are displayed in display 300. Selector 130 determines that a candidate for the appliance name, for which the selection is accepted, is the appliance name of appliance 600, and causes appliance name storage 154 to store the determined appliance name.

When the selection for the name of appliance 600 is accepted, for example, speech sentence creator 140 creates a speech sentence containing the accepted name, for a speech sentence relating to appliance 600. Meanwhile, if the selection for the name is not accepted and the name setting is "not set" as shown in FIG. 10, for example, speech sentence creator 140 creates a speech sentence containing information indicating an installation location of the target appliance, which is estimated by installation location estimator 120, for the speech sentence relating to appliance 600.

Processing Steps

Subsequently, steps in processing performed by voice speech device 500 is described.

Figure 11:
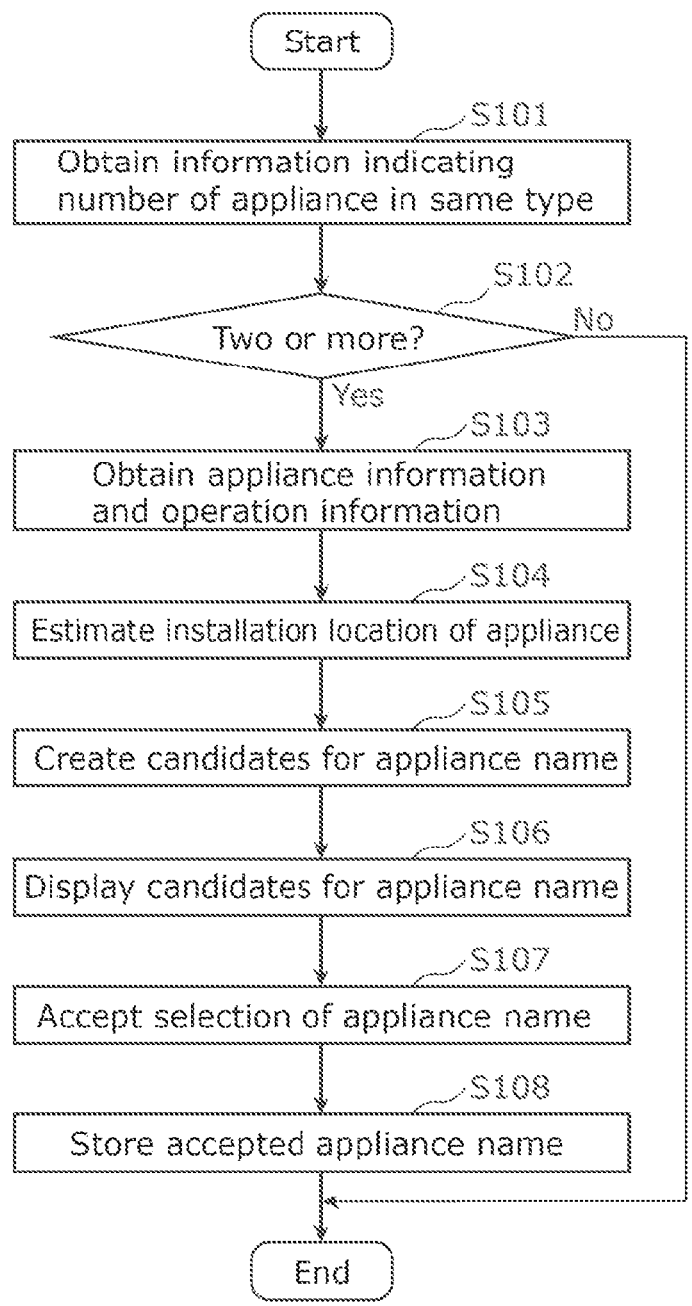
FIG. 11 is a flowchart showing a processing order in which the voice speech device according to the embodiment sets an appliance name.

FIG. 11 is a flowchart showing steps in processing of setting an appliance name, which is performed by voice speech device 500 according to the present embodiment. It should be noted that an appliance (the target appliance) to which voice speech device 500 provides a name is referred to as appliance 600 in the following description with reference to FIG. 11.

When appliance 600 is newly connected in a communicable manner and the appliance information and state information of appliance 600 are received from appliance 600, voice speech device 500 stores the received appliance information and starts processing shown in a flowchart of FIG. 11. Alternatively, when an instruction is obtained from a user via receptor 400 to provide a name to appliance 600, voice speech device 500 starts the processing shown in the flowchart of FIG. 11. Before the processing in the flowchart of FIG. 11 starts, the appliance information of appliance 600 to be named by voice speech device 500 is stored in appliance information storage 152, and the operation information of appliance 600 is stored in operation history storage 151.

First, selector 130 obtains information indicating the number of the appliance of the same type as appliance 600 (S101). For example, if appliance information has been received from an appliance other than appliance 600 in the past, appliance information storage 152 may store this appliance information. Selector 130 counts how much appliance information of appliances of the same type as appliance 600 is stored in appliance information storage 152, based on the appliance information stored in appliance information storage 152, to obtain information indicating the number of appliances of the same type as appliance 600.

It should be noted that information indicating the number of the appliance for each of the types may be stored in appliance information storage 152. If the appliance information is received from a new appliance via receiver 110, for example, selector 130 may cause appliance information storage 152 to store the received appliance information, count the appliance stored in appliance information storage 152 for each of the types, and cause appliance information storage 152 to store a count result. Selector 130 may obtain the result so as to obtain information indicating the number of appliance of the same type as appliance 600.

Subsequently, selector 130 performs determination as to whether the number of the appliance of the same type as appliance 600, which is stored in appliance information storage 152, is two or more (Step S102).

If determining that the number of the appliance of the same type as appliance 600, which is stored in appliance information storage 152, is not two or more (No in Step S102), i.e., the appliance of the same type as appliance 600 is not stored in appliance information storage 152 other than appliance 600, selector 130 terminates the processing, for example.

There may be no appliance of the same type as appliance 600, and the type of appliance 600 may be an "air conditioner", for example. In such a case, even if voice outputting device 200 outputs voice indicating that the name of appliance 600 is the "air conditioner", relating to appliance 600, a user can distinguish which air conditioner the voice indicates. Accordingly, if No in Step S2, the processing is terminated without providing a name to appliance 600, thereby reducing throughput. As such, when there is only one "air conditioner" in terms of the appliance type that is indicated by the appliance information of appliance 600, speech sentence creator 140 creates a speech sentence of "the air conditioner starts cooling", for example, which does not contain the installation location of appliance 600.

Meanwhile, when selector 130 determines that the number of the appliance of the same type as appliance 600, which is stored in appliance information storage 152, is two or more (Yes in Step S102), installation location estimator 120 obtains the appliance information and operation information of appliance 600 (Step S103).

Next, installation location estimator 120 estimates an installation location of appliance 600 (Step S104). Installation location estimator 120 estimates the installation location of appliance 600 by performing processing described with reference to FIGS. 3 to 10.

Next, selector 130 creates candidates for the name of appliance 600 based on the installation location of appliance 600, which is estimated by installation location estimator 120, and the appliance information of appliance 600 (e.g., information indicating a type of appliance 600) (Step S105).

Then, selector 130 causes display 300 to display information indicating the created candidates for the name of appliance 600 (Step S106).

Then, selector 130 accepts the selection of the name of appliance 600 from a user via receptor 400 (Step S107).

Then, selector 130 causes appliance name storage 154 to store information indicating the name of appliance 600, for which the selection has been accepted from the user, as the appliance information (Step S108).

Figure 12:
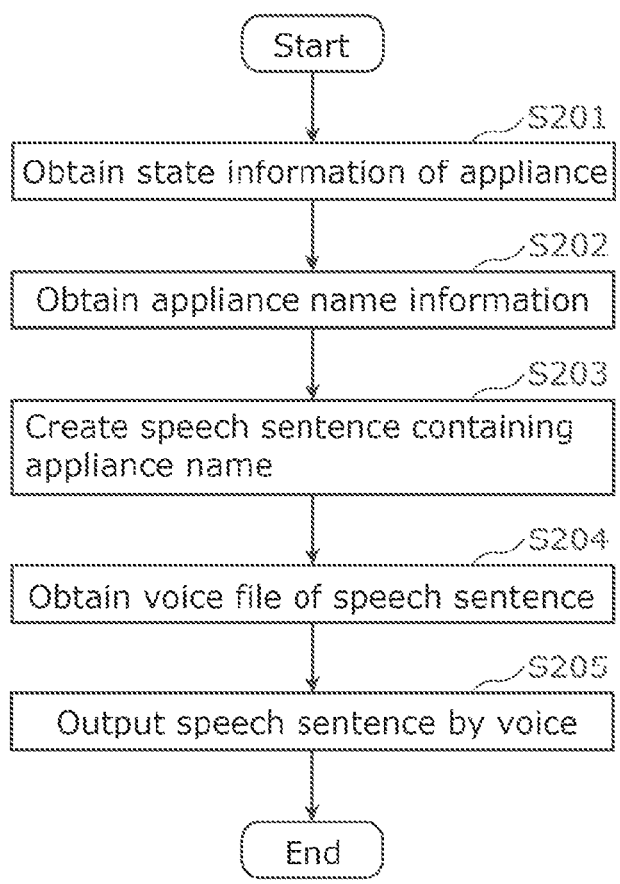
FIG. 12 is a flowchart showing a processing order in which the voice speech device according to the present embodiment causes a voice outputter to output voice.

FIG. 12 is a flowchart showing the order of processing in which voice speech device 500 according to the present embodiment causes voice outputter 230 to output voice.

First, it is assumed that speech sentence creator 140 receives the state information indicating a state of appliance 600 from appliance 600 via receiver 110 (Step S201). It should be noted that appliance 600 can output information indicating that the state changes, as the state information, when the state changes.

Then, speech sentence creator 140 obtains appliance name information indicating the appliance name of appliance 600 from appliance name storage 154 (Step S202).

Speech sentence creator 140 creates a speech sentence that contains the name of appliance 600 and indicates the state of appliance 600, based on the appliance name information and the state information (Step S203). For example, speech sentence creator 140 creates a speech sentence by obtaining, from speech sentence storage 155, and combining a plurality of words and/or sentences (phrases) based on the appliance name information and the state information. For example, speech sentence creator 140 repeatedly obtains the state information of appliance 600 via receiver 110 from appliance 600, and creates a speech sentence for notifying a user of change in the state of appliance 600, when the state of appliance 600 indicated by the state information changes.

Speech sentence creator 140 obtains a voice file corresponding to the created speech sentence from speech sentence storage 155 (Step S204). For example, speech sentence creator 140 obtains, from speech sentence storage 155, and combines a plurality of voice files according to words and/or sentences contained in the created speech sentence, thereby creating a voice file corresponding to the speech sentence.

Then, speech sentence creator 140 causes voice outputter 230 to output voice based on the created voice file (Step S205).

Modified Example

The above-described configuration of voice speech device 500 may be embodied as a combination of a server with a television or such a voice outputtable appliance, but not as a single device, such as a television only. In other words, the configuration may be embodied as a system.

Figure 13:
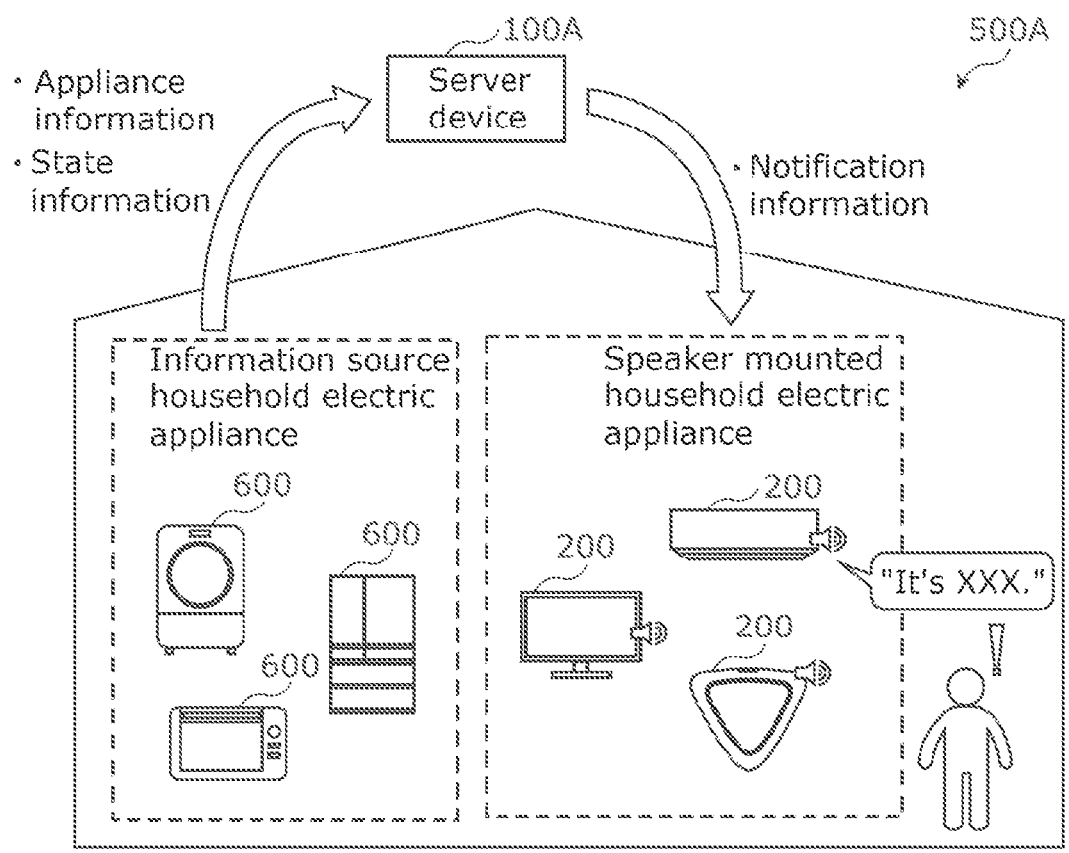
FIG. 13 is a schematic diagram showing a specific configuration of a voice speech system according to an embodiment.

FIG. 13 is a schematic diagram showing a specific configuration of voice speech system 500A according to an embodiment.

When information is outputted from appliance 600, voice speech system 500A notifies the user of the information, as voice speech device 500. The information includes: information indicating that processing state is changed; information notifying breakdown; information encouraging a user to change a component, such as a filter; information for notifying a user of functions that belong to appliance 600 (recommendable information), and so on.

As shown in FIG. 13, voice speech system 500A includes one or more appliances 600, server device 100A, and one or more voice outputting devices 200.

Appliance 600 includes, for example, a communication interface for communicating with server device 100A, an executor that performs cooling processing, washing processing, heating processing, and so on, a detector embodied by a sensor or the like for detecting a state of appliance 600, a controller embodied by a processor, memory, and so on that control various processing of appliance 600.

Server device 100A creates a speech sentence to be outputted by voice outputting device 200, based on the state information received from appliance 600, and causes voice outputting device 200 to output the created speech sentence. When the state information is received from appliance 600, sever device 100A selects a voice file corresponding to the state information (voice data) and sends the voice file to voice outputting device 200, so as to cause voice outputting device 200 to output voice corresponding to the voice file, for example.

Server device 100A is embodied by, for example, a computer provided with appliance 600, a communication interface for communicating with voice outputting device 200 and such a device, a non-volatile memory in which a program is stored, a volatile memory that is a temporal storage area for executing the program, an input/output port for sending and receiving a signal, a processor for executing the program, and so on.

Voice outputting device 200 is an electric appliance including an air conditioner, a television, an autonomous running cleaner, and is an appliance provided with components that can output voice, such as a speaker (a household electric appliance equipped with a speaker). When the voice file (notification information) is received from server device 100A, for example, voice outputting device 200 outputs voice based on the received voice file.

Although FIG. 13 shows three appliances 600, the number of appliance 600 provided in voice speech system 500A may be one or multiple, and thus is not limited in particular.

In addition, although FIG. 13 shows three voice outputting devices 200, the number of voice outputting device 200 provided in voice speech system 500A may be one or multiple, and thus is not limited in particular.

Server device 100A is connected to each of three appliances 600 and each of three voice outputting devices 200 via network N, such as the Internet, in a communicable manner.

Server device 100A may be connected to each of three appliances 600 and each of three voice outputting devices 200 via local area network (LAN) and the like in a communicable manner, or in a radio communicable manner.

A communication standard used for the communication between server devices 100A and each of three appliances 600 and each of voice outputting devices 200 is not particularly limited. Examples of the communication standard include Wi-Fi (registered trademark), Bluetooth (registered trademark), and ZigBee (registered trademark), and so on.

Each of three appliances 600 and each of three voice outputting devices 200 are placed inside a house where a user lives in, for example. Furthermore, server device 100A is placed exterior of the house, for example.

Figure 14:
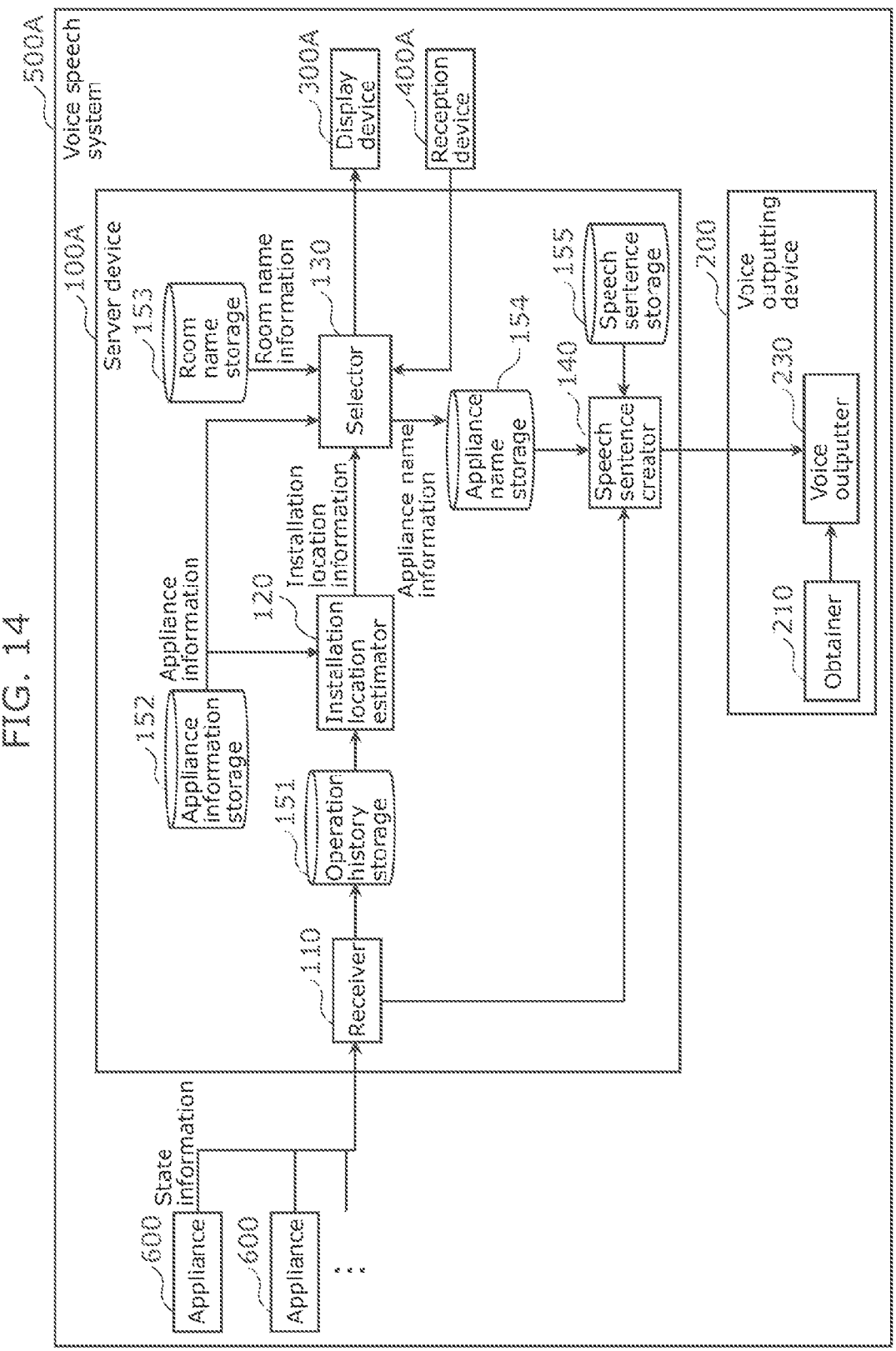
FIG. 14 is a block diagram showing a configuration of the voice speech system according to the embodiment.

FIG. 14 is a block diagram showing a configuration of voice speech system 500A according to the present embodiment. In FIG. 14, only two appliances 600 are shown as representative, and only one voice outputting device 200 is shown as representative.

As shown in FIG. 14, voice speech system 500A includes one or more appliances 600, server device 100A, and voice outputting device 200, display device 300A, and reception device 400A.

Server device 100A includes receiver 110, installation location estimator 120, selector 130, speech sentence creator 141, operation history storage 151, appliance information storage 152, room name storage 150, appliance name storage 154, and speech sentence storage 155. Accordingly, server device 100A includes the respective structural components provided in speech sentence processor 100 in voice speech device 500.

The processing performed in server device 100A is basically the same as those in speech sentence processor 100, as mentioned above, except that the processing to display 300 corresponds to processing to display device 300A and the processing to receptor 400 is processing to reception device 400A. Accordingly, the description for server device 100A is omitted. For example, server device 100A includes selector 130 that causes display device 300A to display one or more candidates for the name to be provided to appliance 600 (target appliance) and accepts the selection of one name candidate among one or more name candidates via reception device 400A, receiver 100 for receiving state information (first state information) that is sent from appliance 600 and indicates a state of appliance 600, and speech sentence creator 140 that creates a speech sentence that includes the one name accepted by reception device 400A for notifying the state of appliance 600.

Voice outputting device 200 is a device that outputs the speech sentence created by server device 100A (specifically, speech sentence creator 140) by voice. Specifically, voice outputting device 200 is a device that outputs voice in accordance with a voice file obtained from server device 100A (specifically, speech sentence creator 140). Voice outputting device 200 also outputs voice based on information of change in the state of own device.

Voice outputting device 200 is, for example, an electric appliance including an air conditioner, a television (TV), an autonomous running cleaner, as described above, and is an appliance provided with components that can output voice, such as voice outputter 230.

As described above, the present disclosure may be embodied as one device including an air conditioner, a television, an autonomous running vacuum cleaner, and such an electric appliance, like voice speech device 500 shown in FIG. 1. Alternatively, the present disclosure may be embodied as a plurality of devices (system) including server device 100A and voice outputting device 200.

Voice outputting device 200 includes obtainer 210 and voice outputter 230.

Obtainer 210 obtains information indicating change in the state of the own device. When a sensor or the like (not shown) provided in voice outputting device 200 detects change in the state, for example, obtainer 210 outputs voice based on the detection result. If voice outputting device 200 is an autonomous running vacuum cleaner, for example, obtainer 210 obtains information indicating the state of the own apparatus (or change in the status, for example), such as information regarding whether cleaning starts.

Voice outputter 230 outputs, by voice, a speech sentence created by speech sentence creator 140. Specifically, voice outputter 230 outputs voice based on a voice file obtained from speech sentence creator 140. In addition, voice outputting device 200 causes voice outputter 230 to output a speech sentence corresponding to information indicating change in the state of the own device (voice outputting device 200) obtained from obtainer 210. For example, if voice outputting device 200 is an autonomous running vacuum cleaner and cleaning starts, voice outputter 230 outputs voice expressing "start cleaning".

A speech sentence and a voice file corresponding to the speech sentence may be stored in a storage (not shown), such as HDD, and the storage may be provided in voice outputting device 200. Alternatively, the speech sentence and the voice file corresponding to the speech sentence may be stored in speech sentence storage 155. For example, voice outputting device 200 outputs, to speech sentence creator 140, information indicating change in the state of the own device, which is obtained from obtainer 210. In addition, speech sentence creator 140 obtains a voice file from speech sentence storage 155, in accordance with the obtained information, and outputs the obtained voice file to voice outputting device 200. Voice outputting device 200 causes voice outputter 230 to output voice corresponding to the obtained voice file.

Voice outputting device 200 may include a communication interface for communicating with server devise 100A. The communication interface is embodied by a connector or the like to which a communication wire is connected when voice outputting device 200 communicates with server device 100A via a wired communication, and is embodied by an antenna and a wireless communication circuit or the like when voice outputting device 200 communicates with server device 100A via a wireless communication.

Appliance 600 may include voice outputting device 200, or may not include the same. In other words, server device 100A may not create a speech sentence containing a name of voice outputting device 200. Specifically, when outputting a speech sentence regarding the own device by voice, voice outputting device 200 may output a speech sentence which does not contain the name of the own device through the voice. Alternatively, when causing voice outputting device 200 to output voice, server device 100A may not create the speech sentence relating to voice outputting device 200. Accordingly, server device 100A does not deal with the state information of voice outputting device 200, based on the assumption that server device 100A does not obtain the state information of voice outputting device 200.

Voice outputter 230 is embodied by, for example, a speaker, an amplifier, a memory in which a control program for outputting voice based on a voice file obtained from speech sentence creator 140 via the speaker is stored, a processor that executes the control program, and so on.

Display device 300A displays an image in accordance with an instruction from selector 130. Display device 300A includes, for example, a display for displaying an image, a memory in which a control program for displaying, on the display, an image based on information received from server device 100A, a processor for executing the program, and a communication interface for communicating with server device 100A. The communication interface is embodied by a connector or the like to which a communication wire is connected when display device 300A communicates with server device 100A via the wired communication, and is embodied by an antenna and a wireless communication circuit or the like if display device 300A communicates with server device 100A via the wireless communication.

Reception device 400A accepts an instruction from a user, and outputs information indicating the accepted instruction to selector 130. Reception device 400A is provided with, for example, a receptor including a mouse, a keyboard, a touch panel, and so on, a memory in which a control program for outputting information accepted by the receptor to server device 100A is stored, a processor for executing the program, and a communication interface for communicating with server device 100A. The communication interface is embodied by a connector or the like to which a communication wire is connected when reception device 400A communicates with server device 100A via the wired communication, and is embodied by an antenna and a wireless communication circuit or the like if reception device 400A communicates with server device 100A via the wireless communication.

It should be noted that voice outputting device 200, display device 300A, and reception device 400A may be integrally embodied, as a television or the like. In such a case, reception device 400A may be a console or the like that outputs information to the television and so on.

Effects

As described above, voice speech device 500 according to an embodiment includes: display 300; selector 130 that causes display 300 to display one or more candidates for a name to be provided to a target appliance (appliance 600 to which a name will be provided hereinafter among one or more appliances 600), and accepts selection of one name among the one or more candidates; receiver 110 for receiving first state information that is sent from the target appliance and indicates a state of the target appliance; speech sentence creator 140 that creates a speech sentence for notifying the state of the target appliance based on the first state information received by receiver 110, the speech sentence containing the one name accepted by selector 130; and voice outputter 230 that outputs the speech sentence by voice.

With this configuration, a user can check one or more candidates for the name of appliance 600, which is displayed in display 300, and can easily select the desired name of appliance 600 among one or more candidates for the name by operating receptor 400. According to voice speech device 500, an appropriate appliance name (e.g., a name that is easily understand, a name that is easily heard, or such names desired by a user) can be easily set.

Furthermore, voice speech device 500 further includes, for example: operation history storage 151 that stores operation information indicating an operation history of the target appliance; appliance information storage 152 that stores appliance information indicating performance of the target appliance; and installation location estimator 120 that estimates an installation location of the target appliance based on the operation information and the appliance information. In this case, selector 130 creates a name containing information indicating the installation location of the target appliance as at least one candidate among the one or more candidates for the name, and causes display 300 to display the one or more candidates including the at least one candidate created.

With this configuration, the candidates for the name of the appliance, which display 300 displays for the user, include a candidate that contains the installation location of the target appliance. If the candidate contains the installation location, a user can easily identify appliance 600 among a plurality of appliances 600, when hearing the voice. As described above, voice speech device 500 can cause display 300 to display a candidate for the name of the target appliance, which is easily understandable for the user.

Furthermore, speech sentence creator 140: creates the speech sentence containing the one name accepted by selector 130, when selector 130 accepts the selection of the one name among the one or more candidates for the name; and creates a speech sentence containing the information indicating the installation location of the target appliance, which is estimated by installation location estimator 120, when selector 130 does not accept the selection of the one name among the one or more candidates for the name.

With this configuration, speech sentence creator 140 can create a speech sentence supposed to be easily understandable for a user as to which appliance is the target appliance, even in a case when selector 130 does not accept the name of the target appliance from the user.

The target appliance is an autonomous running vacuum cleaner, for example. The operation history contains traveling route information that is obtained from the target appliance, and indicates a traveling route of the target appliance. In this case, installation location estimator 120 performs estimation on at least one of a total number of legs of furniture placed in a space where the target appliance has run and a layout of the furniture based on the traveling route information, and estimates the installation location of the target appliance based on a result of the estimation.

The target appliance may be placed in a house. Furniture may also be placed in the house with high possibility. Therefore, installation location estimator 120 estimates an installation location of the target appliance in accordance with information based on the furniture, and thus estimates an installation location accurately, with inhibiting an error, such as failure in the estimation.

Furthermore, the appliance information further indicates a type of each of a plurality of appliances 600 including the target appliance, for example. In this case, selector 130 calculates a total number of appliances 600 of a same type as the target appliance among the plurality of appliances 600, determines a total number of letters of each of the candidates for the name for the target appliance based on the total number of the appliances 600 in the type which is calculated, and creates the at least one candidate to have a same number of letters as the total number of the letters determined, for example.

For example, the type of the target appliance may be an air conditioner, and there may be many air conditioners in a single house. In such a case, if the appliance is provided with a unique name, it is likely to be difficult to identify the name when the name is heard by voice. In view of the above, the more the number of appliances 600 of the same type as the target appliance is, the more the number of letters of the name candidates for the name of the target appliance is prepared. Therefore, even if there are many appliances 600 in the same type, a user is prevented from failing to hear the name of target appliance 600 due to the length of the name.

Furthermore, the voice speech device includes obtainer 210 that obtains second status information indicating a state of voice speech device 500. In this case, speech sentence creator 140 creates a speech sentence that does not contain a name of voice speech device 500, when obtainer 210 obtains the second state information.

Even if the voice is for notifying a user of the information relating to the own device and the voice does not contain a subject, a user can identify appliance 600 which the voice relates to. Therefore, with this configuration, the execution of unnecessarily setting of the appliance name or the like can be prevented.

Furthermore, voice speech system 500A according to an embodiment includes: display device 300A; reception device 400A that accepts selection from a user; server device 100 A including: selector 130 that causes display device 300A to display one or more candidates for a name to be provided to a target appliance and accepts the selection for one name among the one or more candidates via reception device 400A; receiver 110 for receiving first state information that is sent from the target appliance and indicates a state of the target appliance; and speech sentence creator 140 that creates a speech sentence for notifying the state of the target appliance, based on the first state information received by receiver 110, the speech sentence containing the one name accepted by reception device 400A, and voice outputting device 200 that outputs the speech sentence by voice.

With this configuration, effects same as those obtained by voice speech device 500 can be exhibited.

A voice speech method according to an embodiment includes: causing display 300 to display one or more candidates for a name to be provided to a target appliance, and accepting selection of one name among the one or more candidates (e.g., Step S106 and Step S107); creating a speech sentence for notifying a state of the target appliance, based on first state information, when receiver 110 receives the first state information that is sent from the target appliance and indicates the state of the target appliance, the speech sentence containing the one name accepted in the accepting (e.g., Step S203); and outputting the speech sentence by voice (e.g., Step S205).

With this configuration, effects same as those obtained by voice speech device 500 can be exhibited.

Other Embodiments

Although the voice speech device and so on, according to the present disclosure, are described based on the embodiments, the present disclosure is not limited to the embodiments above.

For example, a speech sentence created by speech sentence creator 140, which includes "the air conditioner in the bedroom stops the operation", and so on, is merely an example, and any speech sentence may be set.

In addition, in the embodiments described above, voice speech device 500 stores an appliance name of appliance 600, using appliance name storage 154. For example, voice speech device 500 may output appliance name information for causing an exterior storage (e.g., server device 100A and the like that is connected to voice speech device 500 in a communicable manner) to store the appliance name information indicating the appliance name stored in appliance name storage 154.

In the above embodiments, all or a part of structural elements of installation location estimator 120, selector 130, and so on, which are provided in each of a voice speech device and voice speech system may be configured by a dedicated hardware or may be embodied by executing a software program suitable for the respective structural elements. Each of the structural components may be embodied in a manner that a program executer including a CPU, a processor, and so on reads and executes a software program stored in a storing medium, such as HDD and a semiconductor memory.

In addition, the structural components of the processor may be configured by a single or a plurality of electronic circuits, for example. The single or the plurality of electronic circuits each may be a versatile circuit, or a dedicated circuit.

A single or a plurality of electronic circuits may include a semiconductor device, an integrated circuit (IC), a large scale integration (LSI) and so on, for example. The IC or the LSI may be integrated in a single chip, or may be integrated in a plurality of chips. In the present disclosure, IC or LSI is used. Although the integrated circuit is called as IC or LSI, the name of the integrated circuit is changed depending on the degree of the integration. Accordingly, a system LSI, very large scale integration (VLSI), or ultra large scale integration (ULSI) may be used. In addition, a field programmable gate array (FPGA) that is programmed after the production of LSI can be used for the same purpose.

A comprehensive or a specific embodiment may be embodied by a system, a device, a method, an integrated circuit, or a computer program, or may be embodied by a computer-readable non-temporal storing medium including an optical disk, HDD, or a semiconductor memory, in which the computer program is stored. Furthermore, the comprehensive or specific embodiment may be embodied by any combination of the system, the device, the method, the integrated circuit, the computer program, and the storing medium.

For example, the configuration of voice speech device 500 and the configuration of voice speech system 500A may be combined and embodied. The present disclosure may be embodied by, for example, a system provided with: an appliance; a server device that receives appliance information indicating the appliance from the appliance and sends, to the voice speech device, the received appliance information and information indicating a speech sentence relating to the appliance indicated by the appliance information; and a voice speech device that outputs voice in accordance with the information indicating a speech sentence, which is received from the server device when state information is received from the appliance.

In addition, the present disclosure involves embodiments obtained by applying various variations conceivable by a person skilled in the art to the present embodiments, embodiments configured by any combination of structural components in the embodiments different from one another.

INDUSTRIAL APPLICABILITY

The present disclosure can be applied to an appliance that can output voice, such as a television, an autonomous running vacuum cleaner, and so on. Alternatively, the present disclosure can be applied to an appliance, such as a server, which can control an appliance capable of outputting voice.

The invention claimed is:

1. A voice speech device comprising:
a display;
a selector that causes the display to display one or more candidates for a name to be provided to a target appliance;
a receiver that receives first state information that is sent from the target appliance and indicates a state of the target appliance;
an operation history storage that stores operation information indicating an operation history of the target appliance;
an appliance information storage that stores appliance information indicating performance of the target appliance;
an installation location estimator that estimates an installation location of the target appliance based on the operation information and the appliance information, wherein the selector creates, as at least one candidate among one or more candidates for the name, a name containing information indicating the installation location estimated by the installation location estimator, and accepts selection of one name among the one or more candidates;
a speech sentence creator that creates a speech sentence for notifying the state of the target appliance based on the first state information received by the receiver, the speech sentence containing the one name accepted by the selector; and
a voice outputter that outputs the speech sentence by voice.

2. The voice speech device according to claim 1, wherein:
the target appliance is an autonomous running vacuum cleaner,
the operation history contains traveling route information that is obtained from the target appliance, and indicates a traveling route of the target appliance, and
the installation location estimator performs estimation on at least one of a total number of legs of furniture placed in a space where the target appliance has run and a layout of the furniture based on the traveling route information, and estimates a room in which the target appliance has been installed based on a result of the estimation.

3. The voice speech device according to claim 1, wherein:
the target appliance is one of a plurality of appliances,
the appliance information further indicates a type of each of the plurality of appliances including the target appliance, and
the selector calculates a total number of appliances of a same type as the target appliance among the plurality of appliances, determines a total number of letters of each of the candidates for the name for the target appliance based on the total number of the appliances in the type which is calculated, and creates the at least one candidate to have a same number of letters as the total number of the letters determined.

4. The voice speech device according to claim 1, comprising:
an obtainer that obtains second status information indicating a state of the voice speech device, wherein
the speech sentence creator creates a speech sentence that does not contain a name of the voice speech device, when the obtainer obtains the second state information.

5. A voice speech system comprising:
a display device;
a reception device that accepts selection from a user;

a server device including:
- a selector that causes the display device to display one or more candidates for a name to be provided to a target appliance;
- a receiver that receives first state information that is sent from the target appliance and indicates a state of the target appliance;
- an installation location estimator that estimates an installation location of the target appliance based on operation information indicating an operation history of the target appliance and appliance information indicating performance of the target appliance, wherein the selector creates, as at least one candidate among the one or more candidates for the name, a name containing information indicating the installation location estimated by the installation location estimator, and causes the display to display the one or more candidates for the name including the at least one candidate created; and
- a speech sentence creator that creates a speech sentence for notifying the state of the target appliance, based on the first state information received by the receiver, the speech sentence containing the one name accepted by the reception device; and a voice outputting device that outputs the speech sentence by voice.

6. A voice speech method comprising:

estimating an installation location of a target appliance based on operation information indicating an operation history of the target appliance and appliance information indicating performance of the target appliance;

causing a display to display one or more candidates for a name to be provided to the target appliance, and accepting selection of one name among the one or more candidates;

creating a speech sentence for notifying a state of the target appliance, based on first state information, when a receiver receives the first state information that is sent from the target appliance and indicates the state of the target appliance, the speech sentence containing the one name accepted in the accepting; and outputting the speech sentence by voice, wherein:

the one or more candidates include a name containing information indicating the installation location estimated, and as a result that the name containing information indicating the installation location estimated is accepted in the accepting, the speech sentence is created to include information indicating the installation location estimated in the estimating.

* * * * *